Nov. 22, 1955
C. S. JONES
2,724,493
CONVEYOR BELT CLEANING ARRANGEMENT
Filed Oct. 11, 1952
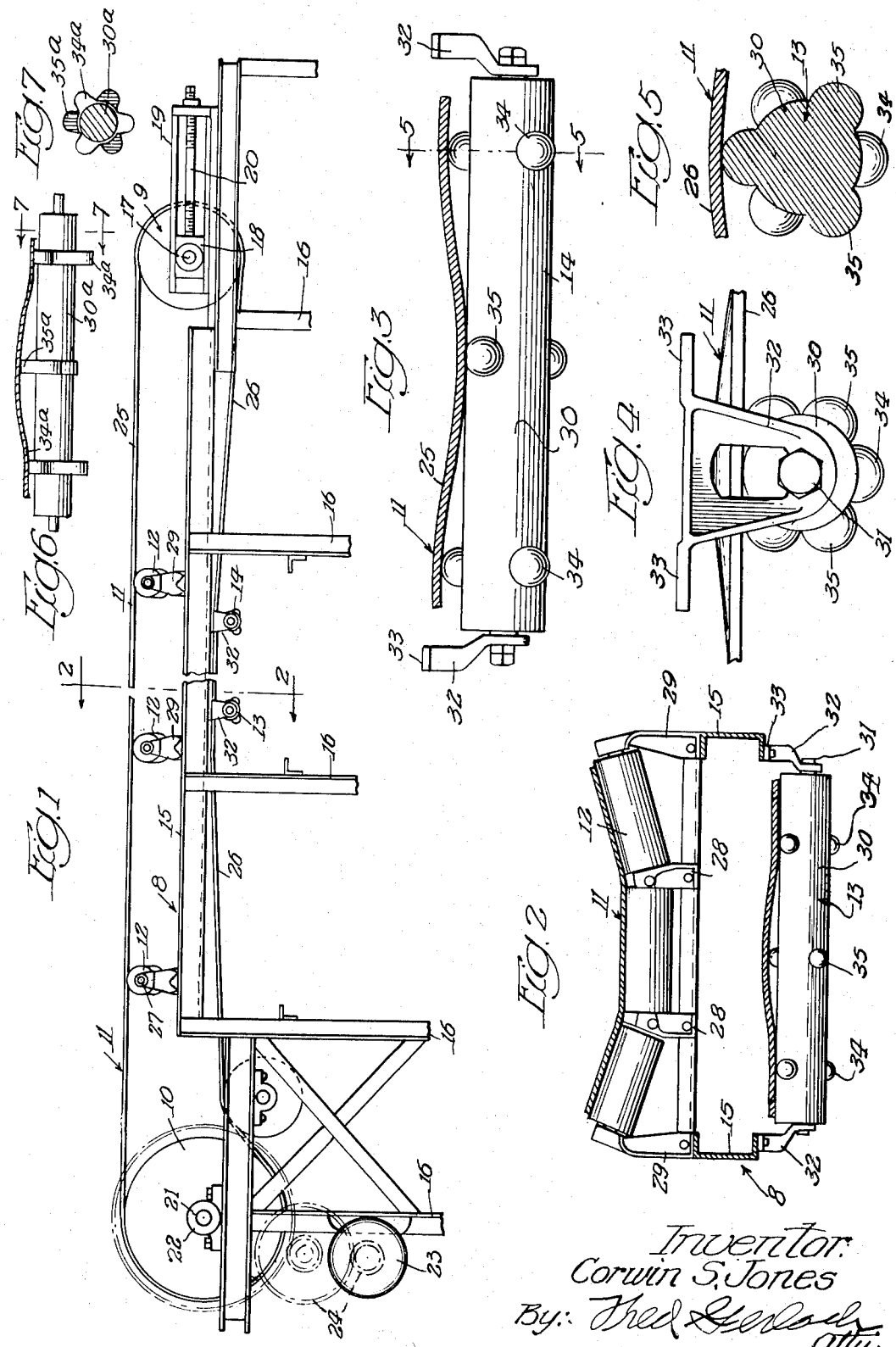
Inventor
Corwin S. Jones

United States Patent Office 2,724,493
Patented Nov. 22, 1955

2,724,493

CONVEYOR BELT CLEANING ARRANGEMENT

Corwin S. Jones, Tiffin, Ohio, assignor to Webster Manufacturing, Inc., Tiffin, Ohio, a corporation of Ohio Application October 11, 1952, Serial No. 314,343

2 Claims. (Cl. 198—230)

The present invention relates generally to belt conveyors. More particularly the invention relates to that type of belt conveyor which is designed to transport or feed bulk material from a receiving station to a discharging station and as its principal components comprises: (1) an elongated supporting frame which extends between the two stations and has horizontally and transversely extending pulleys at its ends; (2) an endless belt which extends around the pulleys and embodies an upper reach for supporting and feeding the material and a lower return reach; (3) a longitudinal series of spaced apart idler rolls which are mounted on the upper portion of the frame between the pulleys and serve to support the upper reach of the belt, (4) a longitudinal series of spaced apart idler rolls which are mounted on the lower portion of the frame between the pulleys and serve to support the return reach of the belt; and (5) a motor which is located at one end of the frame, has speed reducing gearing between it and one of the pulleys and operates in connection with actuation thereof to drive the belt in such direction that its upper reach travels from the receiving station to the discharging station.

When a belt conveyer of the aforementioned type is used as a conveying medium for bulk material that is slightly adhesive or sticky there is a marked tendency for a portion of the material to cling or adhere to the endless belt. It has heretofore been proposed to employ scrapers or stationary or rotary power driven brushes for ridding the belt of any material that tends to stick to it. In practice it has been found that neither scrapers nor brushes effectively or efficiently serve their intended purpose because in some instances they tend to damage the belt and in other instances they remove only portions of the material and spread the balance with such force or action as to make the remainder of the material cling tightly to the belt or penetrate the fibers thereof. If a layer of material is permitted to build up on the outer surface of the belt the belt, due to added weight, requires increased power in-put to drive it. Furthermore, there is a tendency for a portion of the material that tends to cling to the outer surface of the belt to adhere to, and build up on, the idler rolls for supporting the return reach of the belt. If the portion of the material which tends to build up on the idler rolls builds up unevenly so as to form a tapered effect the belt, in connection with drive thereof, is led or urged to one side with resultant damage.

The primary object of this invention is to provide a belt conveyor which is an improvement upon, and has certain inherent advantages over, previously designed conveyors of the same general type and is characterized by the fact that it embodies a simple and novel arrangement whereby any material that tends to stick to the outer surface of the belt is satisfactorily shaken free before it has been compacted or pressed into the pores of the belt to the end that the belt is at all times free of clinging material and hence repuires a minimum power input to drive it, and precludes the possibility of material building up on the idler rolls. Generally speaking the belt cleaning arrangement comprises lugs which are connected to, and project radially outwards from, the periphery of one of the idler rolls for supporting the return reach of the belt and are so designed, constructed and arranged that in connection with operation of the conveyor they vibrate the portions of the belt over the one idler roll in such vigorous manner that any material that adheres to such portion of the belt is jarred or shaken loose.

Another object of the invention is to provide a belt conveyor of the last mentioned type and character in which the one idler roll has three similar annular series of equidistantly spaced lugs, two of the series being located on the end portions of the roll and the third series being located on the central portion of the roll.

A further object of the invention is to provide a belt conveyor of the last mentioned character in which the lugs of the third series, i. e., the lugs on the central portion of the one idler roll, are circumferentially offset with respect to the lugs of the series on the end portions of the one roll in order that the portion of the belt that overlies the one roll is caused not only to vibrate but also to undulate in a direction at right angles to the length of the return reach of the belt.

A further object of the invention is to provide a belt conveyor which is generally of new and improved construction, effectively and efficiently fulfills its intended purpose and is capable of being produced at a comparatively low cost.

Other objects of the invention and the various advantages and characteristics of the present belt conveyor will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a side elevation of a belt conveyor embodying the invention;

Figure 2 is an enlarged vertical transverse section taken on the line 2—2 of Figure 1 and illustrating in detail the construction and design of the idler roll which embodies the lugs for so vibrating and undulating the superjacent portion of the return reach of the belt as to rid the belt of any material that tends to adhere or stick to its outer surface;

Figure 3 is an enlarged side elevation showing the lug equipped idler roll after it has been turned or rotated approximately 60° with respect to the position in which it is shown in Figure 2;

Figure 4 is an end elevation of the lug equipped idler roll;

Figure 5 is a transverse section taken on the line 5—5 of Figure 3;

Figure 6 is a side elevation of an idler roll which constitutes a second embodiment of the invention and differs from the lug equipped idler roll of Figures 1 to 5, inclusive, in that the lugs, instead of being formed separately from one another, are in the form of three laterally spaced star type wheels; and Figure 7 is a transverse section taken on the line 7—7 of Figure 6.

The belt conveyor which is shown in Figures 1 to 5, inclusive, of the drawing constitutes the preferred form or embodiment of the invention. It serves as a medium or instrumentality for transporting or feeding bulk material from a receiving station to a discharge station and comprises a horizontally elongated supporting frame 8, a pair of pulleys 9 and 10 at the ends of the frame, an endless belt 11 around the pulleys, a longitudinal series of idler rolls 12 for supporting the upper reach of the belt and a pair of idler rolls 13 and 14 for supporting the lower reach of the belt. Except for the idler roll 13 which is described hereafter in detail and serves as a means for vibrating and undulating the superjacent portion of the return reach of the belt 11 the conveyor is standard or conventional.

The frame 8 of the conveyor consists of a pair of parallel laterally spaced channel beams 15 and depending legs 16. The channel beams extend horizontally and are suitably maintained in laterally spaced relation. The legs 16 are connected to the ends of the channel beams and serve to hold the latter in an elevated position with respect to the floor or foundation over which the conveyor as a whole is positioned.

The pulley 9 is located adjacent the aforementioned receiving station and extends transversely of the channel beams 15 of the frame. It is provided at its ends with trunnions 17 which are rotatably mounted in a pair of block type bearings 18. The latter are mounted for horizontal sliding movement lengthwise of the frame 8 in slideways 19 and have associated therewith horizontally extending adjusting screws 20 whereby the pulley 9 may be shifted laterally in a horizontal plane for belt take-up purposes. The pulley 10 is located adjacent the discharge station and embodies at its ends outwardly extending trunnions 21, which, as shown in Figure 1, are journalled in a pair of bearings 22 which rest on, and are fixedly secured to, the subjacent ends of the channel beams 15. An electric motor 23 and speed reducing gearing 24 are associated with the pulley 10 and serve to drive the latter. The motor 23 is suitably mounted adjacent the pulley 10 and is arranged so that its armature shaft is in parallel relation with the trunnions 21. The speed reducing gearing 24 consists of gears and shafts, extends between the armature shaft of the motor 23 and one of the trunnions 21 and serves in connection with actuation of the motor to drive the pulley 10 in a counter-clockwise direction as viewed in Figure 1.

The belt 11 extends lengthwise of the conveyor frame 8 and is formed of vulcanized rubber or any other suitable flexible material. It embodies a horizontal upper reach 25 and a horizontal return reach 26 below the upper reach and has its end portions trained around the pulleys 9 and 10. In response to counterclockwise drive of the pulley 10 the upper reach of the belt 11 travels from right to left as viewed in Figure 1 and the return reach 26 travels from left to right, i. e., from the driven pulley to the pulley 9 that is adjacent the receiving station.

The idler rolls 12 for supporting the upper reach of the belt 11 are spaced equidistantly apart and, as shown in Figure 1, are disposed between the pulleys 9 and 10. They are rotatably mounted on shafts 27, the ends of which are supported by U-shaped brackets 28. If desired the idler rolls 12 may be in the form of so-called troughing rolls in order that the side portions of the upper reach of the belt are supported so that they extend slightly upwards. The U-shaped brackets 28 are mounted on the central portions of the channel beams 15 of the frame 8 and embody standards 29 for supporting the shafts 27. In connection with drive of the endless flexible belt 11 the idler rolls 12 revolve freely about their shafts 27.

The idler roll 13 extends transversely of the frame 8 and is located a small distance inwards of the drive pulley 10. It is disposed between the channel beams 15 of the frame, serves to support the superjacent portion of the return reach 26 of the belt and consists of an elongated horizontally extending cylindrical body 30 and a pair of coaxial outwardly extending trunnions 31 on the central portions of the ends of the body. The trunnions 31 are journalled in bearings 32 in order that the idler roll 13 is free to rotate in response to travel of the return reach 26 of the endless belt. The bearings 32 are provided at the upper corners thereof with outwardly extending lugs 33 which are bolted or otherwise fixedly secured to the lower flanges of the channel beams 15. The length of the idler roll 13 is greater than the width of the belt 11. The cylindrical body 30 of the idler roll 13 embodies around its end portions two annular series of equidistantly spaced hemispherical lugs 34 and embodies around its central portion a single annular series of equidistantly spaced hemispherical lugs 35. Each of the series of lugs around the end portions of the body 30 preferably embodies three lugs and such lugs are disposed 120° apart. It is to be understood that each of the two end series of lugs may embody more or less than three lugs, if so desired. The lugs 34 of the two end series are in horizontal alignment and are adapted in connection with rotation of the idler roll 13 successively to come into contact with the side parts of the superjacent portion of the return reach 26 of the belt and cause such side parts to vibrate or move rapidly up and down so as to dislodge from said side parts any material that tends to stick thereto. The series of lugs 35 around the central portion of the idler roll 13 preferably consists of three lugs and these are positioned 120° apart. The lugs 35 that constitute the central or intermediate series of lugs are adapted, in connection with rotation of the idler roll 13, to be successively brought into engagement with the central part of the superjacent portion of the return reach of the belt and operate rapidly to vibrate said central part so as to rid it of any material that tends to cling or adhere thereto. As shown in Figures 2, 3, 4 and 5, the lugs 35 are circumferentially offset with respect to the lugs 34. Because of this the superjacent portion of the return reach of the belt is caused to undulate in a transverse direction during rotation of the idler roll. In this connection it is contemplated that the lugs 35 will cause the central part of the superjacent portion of the return reach of the belt to move up and down and the lugs 34 will cause the side parts of the superjacent portion of the return reach of the belt to move down and up out of phase with the central part. The combined vibrating and undulating action that is produced by the lugs 34 and 35 serves effectively to rid or dislodge any material that tends to cling or stick to the outer surface of the endless belt 11. The lugs 34 and 35 are preferably formed as integral parts of the body 30 of the idler roll 13 as shown in the drawing, although, if desired, they may be formed separately and welded in place. The idler roll 14 assists the idler roll 13 in supporting the return reach 26 of the endless belt 11. It is located between the idler roll 13 and the pulley 9 and extends transversely of the frame 8. The ends of the idler roll 14 are disposed adjacent the webs of the channel beams 15 and are secured thereto in the same manner as the idler roll 13. If desired the periphery of the idler roll 14 may be smooth throughout or have belt vibrating and undulating lugs like the lugs 34 and 35 on the body 30 of the idler roll 13.

It is contemplated that in connection with use or operation of the conveyor bulk material will be introduced onto the upper reach of the belt at a point directly inwards of the pulley 9. As the belt is driven the material travels on the upper reach of the belt until it passes the drive pulley 10. At such point the material, except that which adheres or sticks to the outer surface of the belt, is discharged from the conveyor. The portion of the return reach of the belt that passes over the idler roll 13 is subjected to the action of the hemispherical lugs 34 and 35. The latter, as previously pointed out, causes the superjacent portion of the return reach of the belt so to vibrate and undulate that any material clinging thereto is dislodged.

Figures 6 and 7 of the drawing illustrate a modified form of idler roll that may be used in place of the idler roll 13. The idler roll of Figures 6 and 7 comprises a cylindrical trunnion-equipped body 30a and is the same as the idler roll 13 except that, instead of having two annular series of hemispherical lugs 34 and the centrally disposed annular series of lugs 35, it embodies three star type wheels. Two of the wheels extend around, and are keyed or otherwise fixedly secured to the end portions of the body 30a and the third wheel extends around, and is keyed or otherwise fixedly secured to, the central portion of the body. Each end wheel embodies three equidistantly spaced outwardly extending lugs 34a with curved or rounded outer ends and the intermediate wheel, i. e., the wheel around the central portion of the body 30a embodies three outwardly extending equidistantly spaced lugs 35a with rounded or arcuate ends. The lugs 34a of the end star type wheels are in horizontal alignment and function in the same manner as the lugs 34 of the idler roll 13. The lugs 35a of the central or intermediate wheel are circumferentially offset with respect to the lugs 34a and function in the same manner as the hemispherical lugs 35 of the idler roll 13.

The herein described belt conveyor effectively and efficiently fulfills its intended purpose and this is directly attributable to the fact that at least one of the idler rolls for supporting the return reach of the endless belt embodies a particular arrangement of lugs whereby the superjacent portion of the return reach of the belt is subjected to such a vibrating and undulating action as to rid it of any material that clings or adheres thereto. Since the lug equipped idler roll does not constitute a part in addition to the regular parts of the conveyor the cost of producing the improved conveyor is not increased to any substantial extent. In view of the cleaning or material ridding action of the lug equipped idler roll the endless belt in connection with operation of the conveyor is always maintained in a clean condition and hence the flexibility of the belt is not impaired and the power in-put to drive the belt will be constant.

The invention is not to be understood as restricted to the details set forth since these may be modified within the scope of the appended claims without departing from the spirit and scope of the invention.

Having thus described the invention what I claim as new and desire to secure by Letters Patent is:

1. In a belt conveyor of the type that is adapted to handle bulk material and comprises an elongated substantially horizontal supporting structure with pulleys at its ends, an endless flexible belt extending lengthwise of the supporting structure and around the pulleys and embodying an upper reach for the material and a return reach beneath the upper reach, and power means for driving one of the pulleys so as to effect travel of the belt, a rotatably mounted idler roll positioned so that it extends transversely of the belt and a portion of its periphery is disposed adjacent a portion of one belt reach, adapted during travel of the belt to be rotated by said portion of the one belt reach, and provided on its periphery with a plurality of annular series of equidistantly spaced outwardly extending lugs which are adapted in connection with travel of the belt and rotation of the idler roll to cause said portion of the one belt reach to vibrate in such manner as to loosen and dislodge any of the bulk material that tends to adhere thereto, each series of lugs being spaced an appreciable distance from, and having its lugs circumferentially offset with respect to the lugs of, the adjacent series of lugs in order that the lugs of all of the series serve transversely to undulate said portion of the one belt reach in addition to vibrating it.

2. In a belt conveyor of the type that is adapted to handle bulk material and comprises an elongated substantially horizontal supporting structure with pulleys at its ends, an endless flexible belt extending lengthwise of the supporting structure and around the pulleys and embodying an upper reach for the material and a return reach beneath the upper reach, and power means for driving one of the pulleys so as to effect travel of the belt, a horizontally disposed rotatably mounted idler roll positioned so that it underlies and extends transversely of the return reach of the belt and the upper portion of its periphery is disposed adjacent a portion of said return reach, adapted during travel of the belt to be rotated by said portion of the return reach of the belt, and provided on only the end and central portions of its periphery with annular series of equidistantly spaced outwardly extending lugs which are adapted in connection with travel of the belt and rotation of the idler roll to cause said portion of the one belt reach to vibrate in such manner as to loosen and dislodge any of the bulk material that tends to adhere thereto, the series of lugs on the end portions of the idler roll being spaced appreciable distances from the series of lugs on the central portion of the idler roll, the lugs of the series on the end portions of the idler roll being horizontally aligned and the lugs on said series on the central portion of the idler roll being circumferentially offset with respect to the other lugs in order that all the lugs serve transversely to undulate said portion of the return reach in addition to vibrating it.

References Cited in the file of this patent

UNITED STATES PATENTS

| 1,239,066 | Winters | Sept. 4, 1917 |
| 1,331,484 | Carr | Feb. 24, 1920 |

FOREIGN PATENTS

| 984,547 | France | July 6, 1951 |